United States Patent Office 3,201,376
Patented Aug. 17, 1965

3,201,376
CURABLE COPOLYMERS CONTAINING CARBOXYL AND ORGANO-METALLIC CARBOXYLATE AND PROCESS FOR THEIR PREPARATION
Stephen W. Osborn, Yardley, and Arthur J. Yu, North Levittown, Pa., assignors to Thiokol Chemical Corporation, Bristol, Pa., a corporation of Delaware
No Drawing. Filed June 27, 1961, Ser. No. 119,799
16 Claims. (Cl. 260—82.1)

The present invention relates to a novel class of organo-metallic polymers and to a novel process for their preparation. In particular, the present invention relates to relatively low molecular weight, liquid, curable metal containing polymers and to the process for their preparation.

The known techniques for incorporating metals into polymeric compositions include the homopolymerization of organo-metallic monomers or the copolymerization of monomers, at least one of which is organo-metallic in nature. Copolymers produced by these procedures, however, are not very closely controllable as to metal content and viscosity and all these polymers both homo- and co-polymers usually are solids and/or are not curable.

The advantages to be obtained by the use of a simple process by means of which liquid, readily curable, organo-metallic interpolymers of a closely controllable metals content and viscosity can be readily produced are many and have been long sought by those in the art who have need for organo-metallic polymers that are liquid; readily curable to solid elastomeric compositions; contain known and prescribable amounts of metal that are both chemically bound to and uniformly distributed throughout the polymeric matrix and are of a prescribable viscosity. It is to the attainment of these useful ends that the novel compositions and process of the present invention are directed.

It was unexpectedly found, according to the present invention, that the above mentioned desirable ends can be obtained if prescribed amounts of various metals, in the form of a particular class of organo-metallic compounds, are reacted with liquid polymers containing a known amount of carboxyl groups.

The organo-metallic compounds contemplated for use according to the present invention are the basic hydroxide and basic oxide compounds having the formulas, respectively, $R_{(n-1)}MOH$ and $R'_{(n'-1)}M'OM^2R^2_{(n^2-1)}$ where $M$, $M'$ and $M^2$ are metals selected from the group consisting of lead, tin, mercury, gallium, thallium, indium, platinum, and germanium and $M'$ and $M^2$ can be the same or different metals; $n$, $n'$ and $n^2$ are the valences, respectively, of $M$, $M'$ and $M^2$ and are 2 to 4; $R$, $R'$ and $R^2$ are selected from the group consisting of alkyl, branched alkyl, aryl, alkaryl, aralkyl and alicylic groups and each of said $R$, $R'$ and $R^2$ groups may be the same or different from the other $R$, $R'$ or $R^2$ groups that may be present in the organo-metallic compounds. Examples of such organo-metallic compounds that may be used according to the present invention include

| | |
|---|---|
| Isodecylmercuric hydroxide (branched) (Containing no branching closer than the second carbon atom) | $C_{10}H_{21}HgOH$ |
| Ethylmercuric hydroxide | $C_2H_5HgOH$ |
| Phenylmercuric hydroxide | $C_6H_5HgOH$ |
| Isobutylmercuric hydroxide | Iso-$C_4H_9HgOH$ |
| Diethylgallium hydroxide | $(C_2H_5)_2GaOH$ |
| Dimethylgallium hydroxide | $(CH_3)_2GaOH$ |
| Bis(dimethylindium) oxide | $[(CH_3)_2In]_2O$ |
| Diphenylindium hydroxide | $(C_6H_5)_2InOH$ |
| Bis(di-n-nonylindium) oxide | $[(C_9H_{19})_2In]_2O$ |
| Dimethylthallium hydroxide | $(CH_3)_2TlOH$ |
| Di-isopropylthallium hydroxide | (Iso-$C_3H_7)_2TlOH$ |
| Di-n-hexylthallium hydroxide | $(n-C_6H_{13})_2TlOH$ |
| Diphenylthallium hydroxide | $(C_6H_5)_2TlOH$ |
| Bis-triethylgermanium oxide | $[(C_2H_5)_3Ge]_2O$ |
| Bis-triphenylgermanium oxide | $[(C_6H_5)_3Ge]_2O$ |
| Tributyltin hydroxide | $(C_4H_9)_3SnOH$ |
| Bis-tributyltin oxide | $[(C_4H_9)_3Sn]_2O$ |
| Triphenyltin hydroxide | $(C_6H_5)_3SnOH$ |
| Triethyltin hydroxide | $(C_2H_5)_3SnOH$ |
| Trimethyltin hydroxide | $(CH_3)_3SnOH$ |
| Bis-diethyldodecyltin oxide | [Branched $(C_{12}H_{25})(C_2H_5)_2Sn]_2O$ |
| Phenyldiethyltin hydroxide | $(C_6H_5)(C_2H_5)_2SnOH$ |
| Trilauryltin hydroxide | $(n-C_{12}H_{25})_3SnOH$ |
| Bis-trilauryltin oxide | $[n-(C_{12}H_{25})_3Sn]_2O$ |
| Triethyllead hydroxide | $(C_2H_5)_3PbOH$ |
| Trimethyllead hydroxide | $(CH_3)_3PbOH$ |
| Triphenyllead hydroxide | $(C_6H_5)_3PbOH$ |
| Tri-n-propyllead hydroxide | $(n-C_3H_7)_3PbOH$ |
| Trimethylplatinum hydroxide | $(CH_3)_3PtOH$ |

These types of organo-metallic basic hydroxidic and basic oxidic compounds are described in "Organo-Metallic Compounds," by G. E. Coates (Methuen's Monographs on Chemical Subjects, Methuen & Co., Ltd., London (John Wiley & Sons, Inc.) 1956) and can be used either alone or in combination with one another to react with the liquid polymers.

The carboxyl group containing polymers contemplated for use according to the present invention are those liquid polymers that contain pendant carboxyl groups dispersed along the backbone of the polymer which may also be capped by carboxyl groups. The preferred liquid polymers are those having molecular backbones essentially consisting of poly-1,3-dienes with lesser amounts of monomeric or block copolymeric units of at least one vinyl acid unit selected from the group consisting of acrylic, methacrylic, maleic, fumaric and itaconic acid units interspersed at random intervals along the polymer backbone with the diene component units.

The 1,3-diene components contemplated for use in the liquid copolymers of the present invention are those having the formula

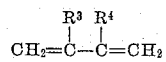

wherein $R^3$ is selected from the group consisting of hydrogen, methyl, chlorine, fluorine and cyano groups and $R^4$ is selected from the group consisting of hydrogen and methyl groups. These 1,3-diene components include 1,3-butadiene, isoprene, chloroprene, fluoroprene, 2-cyano-1,3-butadiene and 2,3-dimethyl-1,3-butadiene. Within the concept of the present invention only the 2,3 positions of the 1,3-diene component may be substituted. The 1,3-diene components of the liquid copolymers contemplated for use in the present invention are used to impart liquid properties to the copolymer. Vinyl acid polymers are normally solids. In preparing these copolymers for use in the process of the present invention therefore, sufficient amounts of the 1,3-diene components must be used to insure that the resulting copolymers are liquid while at the same time sufficient amounts of carboxyl groups must also be present (contributed by the vinyl acid component of the copolymer) to insure that there will be enough carboxyl sites present to accommodate the desired amount of metal that is to be incorporated into the liquid copolymer. The term liquid as used in reference to the present invention indicates that the copolymers and organo-metallic copolymers have a viscosity of up to approximately 10,000 poises when measured at room temperature. 1,3-diene components are not the only components that can be used to form liquid copolymers with the above mentioned vinyl acids within the scope of the present invention. Other liquid monomeric components can be used such as butyl acrylate, 2-ethylhexyl acrylate, octyl acrylate, decyl acrylate and lauryl acrylate. The copolymers contemplated for use in the present invention, therefore, would include the following systems provided the systems are formed with such ratios of the liquid component monomer to the vinyl acid component monomer as to produce a liquid system that contains sufficient carboxyl groups to satisfy the requirements of the objects of the present invention: 1,3-butadiene/acrylic acid; isoprene/methacrylic acid; chloroprene/maleic acid; fluoroprene/fumaric acid; 2-cyano-1,3-butadiene/itaconic acid; 2,3-dimethyl-1,3-butadiene/acrylic acid; butyl acrylate/acrylic acid; 2-ethylhexyl acrylate/methacrylic acid; octyl acrylate/maleic acid; decyl acrylate/fumaric acid and lauryl acrylate/itaconic acid. More than one of the various liquid monomeric components can be used in combination with more than one of the vinyl acid monomeric components to make the liquid, carboxyl group-containing polymers contemplated for use in the process of the present invention.

One of the novel features of the present invention, as mentioned above, is that the metal content of the final product, the liquid, organo-metallic copolymer, can be regulated and prescribed beforehand. To accomplish this it is only necessary to know, according to the present invention, the carboxyl group content of the liquid copolymer with which one is working. Knowing the carboxyl group content it is then possible to react a predetermined amount of the basic hydroxide or basic oxidic metal containing compound to obtain the desired metal content in the organo-metallic copolymer. By leaving some of the carboxyl groups of the liquid copolymer unreacted, that is, by not adding all the metal containing compound that would be needed to stoichiometrically react with all the carboxyl groups that are present, it is thus possible, according to the present invention to obtain a curable, liquid, organo-metallic polymer. If all the carboxyl groups are reacted a stable (non-curable), essentially non-reactive liquid organo-metallic copolymer will be obtained. By leaving unreacted carboxyl groups in the liquid organo-metallic copolymers it is possible to further react these organo-metallic copolymers at the unreacted carboxyl group sites in subsequent reactions, such as in a crosslinking reaction, to produce elastomeric solids and films. A carboxyl group content of at least approximately 0.02 gram equivalent weights per 100 grams of the organo-metallic polymer is needed in order to effect a good cure of the novel liquid polymers of the present invention. Cures can be effected where less than 0.02 gram equivalent weights of carboxyl groups are present per 100 grams of the organo-metallic polymer but the cures are difficult to obtain and the properties of these cured materials may not be as good as those of the materials that contained, prior to cure, at least approximately 0.02 gram equivalent weights of carboxyl groups per 100 grams of polymer.

Where a basic organic metallic hydroxide, $R_{(n-1)}MOH$ (as described above), is to be reacted with the carboxyl group containing liquid copolymer according to the present invention the reaction proceeds as follows:

Equation 1:

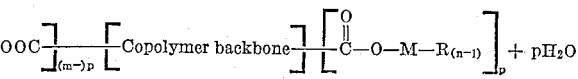

wherein $m$ is the number of pendant carboxyl groups randomly distributed along the backbone (including any terminal carboxyl groups) of the liquid copolymer and $m$ corresponds to a carboxyl group equivalent weight of up to approximately 0.15 gram equivalents per 100 grams of the liquid copolymer; $p$ is the number of moles of the reactant organo-metallic hydroxide and $m-p$ corresponds to a carboxyl group equivalent weight of at least approximately 0.02 gram equivalents per 100 grams of the organo-metallic copolymer. $M$, $n$ and $R$ have the same significance as indicated above. The reaction results in the production of $p$ moles of water and an organo-metallic copolymer that contains $(m-p)$ pendant carboxyl groups and $p$ pendant metallo-ester carboxylate groups. A combination of various organo-metallic hydroxides can be used as well as a single organic metallic hydroxide in the present invention.

Where one or a combination of basic organo-metallic oxides, $R'_{(n'-1)}M'OM^2R^2_{(n^2-1)}$ (as described above), is to be reacted with the carboxyl group containing liquid copolymer according to the present invention the reaction proceeds as follows:

Equation 2:

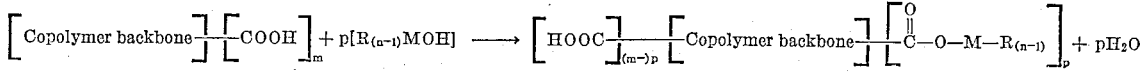

The organo-metallic end production of the reaction shown in Equation 2 may be the same as where the analogous hydroxide $R_{(n-1)}MOH$ is used in the reaction shown in Equation 1. However, only half the number of moles of oxide are needed than are moles of the hydroxide and only half the moles of water of reaction are produced with the reaction shown in Equation 2 $R'$, $R^2$, $M'$, and $M^2$, $m$, $n'$, $n$ and $p$ have the same significance as noted above and $p'$ plus $p^2$ equals $p$ and $P/2$ is the required number of moles of the reactant organo-metallic oxide.

A combination of basic hydroxides and basic oxides can also be used to react with the liquid copolymers to produce the novel organo-metallic copolymers of the present invention.

The novel reaction of the present invention can be carried out at atmospheric pressure and at a temperature within the range of 50 to 100° C. The preferred temperature range for this reaction however is 60 to 80° C. No catalyst is needed to aid in the reaction procedure. The reaction may be conducted in the presence of a solvent which may include aromatic solvents such as benzene, toluene, xylene; chlorinated aromatic solvents such as monochlorobenzene, polychlorobenzene, bromobenzene and nitrobenzene and alkyl phenyl ethers such as arisole.

It may be necessary at times to remove the water of reaction that is formed during the course of the reaction in order to facilitate the completion of the reaction mechanism. Solvents such as methanol, ethanol and isopropanol may be used, if necessary, to remove unreacted organo-metallic compound values from the reaction product as a purification procedure. This is usually not necessary since under the reaction conditions of the present invention all of the organo-metallic compound that is used will usually react with the carboxyl groups of the liquid copolymer.

The viscosity of the resulting organo-metallic copolymer is a function of both the unreacted carboxyl content and the metal content of the organo-metallic copolymer. The carboxyl group attraction phenomena tends to predominate over the influence of the metal content. The end result is that with the addition of more metal and the lowering of the carboxyl content the resulting polymers tend to get less viscous. It is possible, therefore, using the reaction system of the present invention to regulate the viscosity as well as the metal content of the novel organometallic polymers thereby obtained. Within the concept of the present invention R, R' and R² as defined above contain up to about 18 carbon atoms.

In the prior art, alkyl group containing materials were used as plasticizing agents with polymers but these materials were only capable of being physically admixed with the polymers and could be fairly readily removed therefrom by the unavoidable contact of solvents with the polymers. The addition of alkyl groups directly onto the backbone of a polymer by the process of the present invention now allows for the chemical bonding of plasticizing agents onto polymers where they are secure from attack by organic solvents.

The following examples are merely illustrative of the scope of the present invention and are not intended as a limitation thereon.

*Example 1*

This example illustrates the formation of an organo-lead interpolymer which is derived according to the method of this invention from the reaction of triethyl lead hydroxide and a polybutadiene-acrylic acid copolymer.

300 g. of a copolymer of polybutadiene-acrylic acid which had an acid equivalence of 0.085 equivalent weight of —COOH per 100 g. of polymer, and a viscosity of 176 poises was added to a 2 liter, single-necked, round bottom flask. To this, 300 g. of benzene and 46.7 g. (0.16 mol) of triethyl lead hydroxide were added. The reaction mixture became cloudy due to the formation of small droplets of water of neutralization produced by the reaction, but cleared within 20 minutes at ca. 75° F. The reaction flask was put on a rotary film evaporator and the reactants permitted to mix at atmospheric pressure for about 1 hour at ca. 60° C. Vacuum was applied to the reaction vessel to obtain a pressure ca. 10–30 mm. Hg. Vacuum heat and mixing were maintained for ca. 4 hours until a constant weight of product was obtained. 300 ml. of methanol were then added to the reaction vessel and rotationally mixed with the pot product for about 1 hour. The methanol phase was then decanted off leaving a clear, slightly amber pot product. Vacuum was again applied to the rotating reaction vessel at ca. 10–30 mm. Hg and at ca. 60° C. for 2 hours until a constant weight was again obtained. The pot product was a clear amber liquid of 760 poises which contained 0.028 equivalent of carboxyl per 100 g. of polymer and it had a lead content of 7.35% by weight.

*Example 2*

In this example 147 g. of a copolymer of 1,3-butadiene and acrylic acid which had a carboxyl equivalence of 0.068 equivalent weights per 100 g. of polymer was dissolved in 300 ml. of benzene at room temperature in a one liter round bottom flask. To this, 17.6 g. (0.057 equivalent) of triethyl lead hydroxide dissolved in 20 ml. of absolute ethanol were added to the reaction mixture dropwise with stirring. The mixture was stirred for 4 hours at room temperature, ca. 75° F., and at the end of which time 500 ml. of methanol were added to the mixture. The copolymer of this invention that was produced, while soluble in the benzene, now precipitated and formed a viscous layer at the bottom of the flask. The solvents were decanted and the metal containing copolymer product was then dried to a constant weight on a rotary evaporator at 50–60° C. and at a reduced pressure. The copolymer product so produced had a —COOH equivalence of 0.017 per 100 grams of polymer and a yield weight of 165.6 g. The copolymer had a lead content of 5.02%.

*Example 3*

Following the procedure used in Example 2 and using tributyltin hydroxide and a butadiene-acrylic acid copolymer as the reactants an organo-metallic copolymer was produced that contained 5.1% tin and had a carboxyl equivalent of 0.028/100 gr. of the organo-metallic copolymer.

*Example 4*

In this example a copolymer of 1,3-butadiene, and acrylic acid was reacted with a basic organo-metallic oxide, tributyltin oxide, to form a metal containing interpolymer composition of this invention.

A one liter, single necked round bottom flask was charged with 189.2 g. of the copolymer (containing 0.1285 equivalent weight of carboxyl) and 38.4 g. of tributyltin oxide. The reactants were placed on a rotary film evaporator and rotationally mixed at 50° C. under a reduced pressure for 21 hours until a constant weight was obtained. The pot product produced weighed 214.6 g., and was a very viscous, amber translucent liquid. The product had a carboxyl content of approximately 0.00% and a tin content of 3.55%.

When one half the amount of tributyltin oxide used above is used in the same procedure as described above, that is, 19.2 grams, an organo-metallic copolymer is obtained which has a tin content of approximately 1.78%.

*Example 5*

In this example a copolymer of polybutadiene and acrylic acid was reacted according to the method of this invention with a branched chain ten carbon organo-mercuric hydroxide, referred to as isodecyl mercuric hydroxide.

200 g. (containing 0.06 equivalents of —COOH/100 g.) of polymer, 28.7 g. (0.08 equivalent of —OH) of isodecyl mercuric hydroxide and 200 ml. of benzene were added to a one liter round bottom flask and mixed on a rotary mixer at atmospheric pressure for over one hour. The pressure was then lowered to ca. 22 mm. Hg and the mixture was evaporated to a constant weight at 60° C. The product, a viscous amber liquid had an acid equivalence of 0.046 per 100 gram. The yield was 220.0 grams. The mercury content is approximately 2.41%.

*Example 6*

20 g. of a copolymer of polybutadiene-acrylic acid-triethyl lead carboxylate produced according to the process of the present invention and having an acid equivalence of 0.059 COOH per 100 g. of copolymer was thoroughly mixed with 1.30 g. of 2-methyl aziridinyl phosphine oxide to provide an equivalence ratio of —COOH to imine of 1/1.5. The mixture was then poured into a paper cup. The cure mixture was placed in a constant temperature oven set at 77° C. for 72 hours. The dark amber elastomer which was thereby produced was nontacky and uniform, had a quite low tear strength and had a hardness of 6 Shore A degrees.

*Example 7*

20 g. of the copolymer produced in Example 3 above, polybutadiene-acrylic acid-tributyl tin carboxylate, having an acid equivalence of 0.028 of COOH/100 g. of copolymer was intimately mixed with 1.41 g. of diphenyl methane 4,4'-dicyclopropyleneurea, a solid on a paint mill using 4 to 5 passes at room temperature to provide a —COOH/imine ratio of 1/1.5. The paint-milled mixture was then placed in a paper cup and swirled so that it would evenly coat the walls of the cup and the greater portion accumulate at the bottom of the cup. This mixture was then placed in a constant temperature oven at 77° C. for 92 hours. The light amber elastomer which was produced was of uniform consistency and of fair tear resistance with a slightly tacky surface. It possessed a hardness of 16 Shore A degrees. The coated walls of the paper cup showed good adhesion between the cured elastomeric film thereon and the paper, the film being smooth, non-grainy, free of bubbles and rubbery.

Example 8

In this example cure is demonstrated between an interpolymer of this invention such as that described in Examples 1, 2 and 6 above with an imine-type cure agent, diphenyl methane-4,4'-dicyclopropyleneurea.

20 g. of a copolymer polybutadiene-acrylic acid-triethyl lead carboxylate produced according to the process of the present invention and having an acid equivalence of 0.059/100 gr. of copolymer was thoroughly paint-mill mixed with 2.97 g. of the solid, diphenyl methane-4,4'-dicyclopropyleneurea, to give a —COOH/imine ratio of 1/1.5 in the mixture. This mixture was placed in a paper cup and swirled so as to uniformly coat the sides of the cup, the main portion of the mixture accumulating at the bottom of the cup. It was placed in a constant temperature oven at 77° C. for 72 hours to cure. The uniform, nonporous elastomer which was produced had a fair tear resistance and was very dark amber in color. The plug of cured elastomer at the bottom of the cup had a hardness of 23 Shore A degrees. The cup walls were smoothly coated with a cured film of the elastomer which was nonporous, that is, had no bubbles or breaks in the film, and had good adhesion to the cup walls.

Example 9

In this example cure was effected between the free carboxyl sites on the copolymer produced in Example 5 above and an imine-type cure agent.

20 g. of the copolymer, polybutadiene-acrylic acid-isodecyl mercuric carboxylate, having an acid equivalence of 0.046 was carefully paint-milled with 2.31 g. of the solid cure agent, diphenyl methane-4,4'-dicyclopropyleneurea, to provide a —COOH/imine ratio of 1/1.5 and placed into a paper cup. The mixture was swirled to uniformly coat the walls of the paper cup while the main portion of the mixture accumulated at the bottom of the cup. Cure was effected in 72 hours at 77° C. to produce a uniform elastomeric composition that was dark amber in color, had excellent tear resistance, and appeared to be quite "snappy" when pulled and subsequently released. The elastomer was not tacky and possessed a hardness of 33 Shore A degrees. The cup walls were uniformly coated with a smooth, bubble-free film of the cured elastomer that possessed no tears and had excellent adhesion to the paper.

Example 10

The following example illustrates the manner in which an organo-metallic copolymer of the present invention can be prepared with a prescribed viscosity.

A standard solution of 98.35 g. of tributyltin oxide in 500 ml. of benzene was prepared. 100 grams of a butadiene-acrylic acid copolymer having a carboxyl group content of .065 equivalent per 100 g. of copolymer were weighed out in each of four 300 ml. round bottom flasks and also in each of two 500 ml. round bottom flasks. Various amounts of the standard tributyltin oxide solution and benzene, as shown in the table below, were then added to all the flasks. Each of the flasks were then put on a Roto-Vac for 1 hour with full aspirator vacuum to remove the solvent. After this period of time a 50° C. water bath was placed under each flask for 6 hours. The resulting organo-metallic copolymers have the properties shown in the following table:

| Flask# | Ml. of tin solution added to flask | Ml. of benzene added to flask | Viscosity of resulting organo-metallic copolymer (poises at 25° C.) | Carboxyl content, eq./100 g. | Sn content, percent |
|---|---|---|---|---|---|
| 1 (300 ml.) | 100 | 0 | 105 | 0.0 | 6.4 |
| 2 (300 ml.) | 80 | 20 | 158 | 0.013 | 5.1 |
| 3 (300 ml.) | 60 | 40 | 170 | 0.026 | 3.8 |
| 4 (300 ml.) | 40 | 60 | 208 | 0.039 | 2.56 |
| 5 (500 ml.) | 20 | 80 | 220 | 0.052 | 1.28 |
| 6 (500 ml.) | 0 | 100 | 276 | 0.065 | 0.0 |

Using the process of the present invention, therefore, it is possible to produce an organo-metallic copolymer having a specific viscosity and metal content by reacting liquid copolymers having various viscosities and carboxyl group contents with basic oxide and hydroxide organo-metallic compounds containing various sized organic radicals and metals. Because of the variability, at will, of the viscosity and metal content of the organo-metallic copolymers of the present invention as well as of the fact that the metals are chemically bound to the backbone of the organo-metallic copolymer these organo-metallic copolymers are very useful as burning rate modifiers for rocket propellant charges. The regulatable metal content is used to aid in regulating the burning rate of the charge whereas the regulatable viscosity allows for the facile blending of these organo-metallic copolymers into a variety of propellant compositions in that various propellant compositions require liquid burning rate modifiers with different viscosities for blending purposes.

In addition to their utility as burning rate modifiers, the organometallic copolymers of the present invention can be used, upon cure, as novel film and elastomer compositions whose unique compositions afford their employment for a variety of uses.

Within the concept of the present invention, the R, R' and $R^2$ groups as defined above may be substituted with groups that are less reactive with carboxyl groups than the oxide and hydroxide groups of the metal containing compounds and the backbone of the liquid copolymer may be substituted with groups that are less reactive than carboxyl groups with the basic organo-metallic compounds. Various combinations of the liquid copolymers can be reacted with various combinations of the basic organo-metallic compounds within the concept of the present invention.

The value for $p$ has been defined above as approximately equal to $0.15-y$ gram equivalent of —COOH per 100 grams of the organo-metallic copolymer. This definition is merely an approximation and does not take into consideration the relatively slight change in molecular weight that takes place as more of the basic organo-metallic compound is added to the liquid copolymer starting material. A more exact definition of the numerical value of $p$ within the concept of the present invention is given by the following formula;

$$p = \frac{A - 100y}{1 + yW}$$

wherein A is the carboxyl content in gram equivalent weights of the liquid copolymer starting material, $y$ is the carboxyl content in gram equivalent weights of the final organo-metallic copolymer and W is the equivalent weight of the basic organometallic compound. This definition is derived by the following set of equations:

$$\frac{A - p}{100 + p(W)} = y$$

$$A - p = y[100 + p(W)]$$

$$p = A - y[100 + p(W)] = A - 100y - pyW$$

$$p + p(yW) = A - 100y$$

$$p + (1 + yW) = A - 100y$$

$$p = \frac{A - 100y}{1 + yW}$$

According to the present invention $p$ has a value of approximately up to 0.15 gram equivalent of —COOH per 100 grams of polymer and $y$ has a value of at least approximately 0.02 gram equivalents of —COOH per 100 grams of polymer, as noted above.

Other definitions that follow from this according to the present invention are that $p' + p^2 = p$; $p + y = A$ and $p' + p^2 + y = A$ where $p'$, $p$, $y$, and $A$ have the same significance as indicated above.

The curing agents that can be used to cure the curable organo-metallic copolymers of the present invention to produce elastomeric compositions and films therefrom include difunctional curing agents such as diphenyl methane; 4,4'-dicycloethylene urea; toluene dicycloethylene urea (mixed 2,4 and 2,6 isomers); hexamethylene-6,6'-dicycloethylene urea; difunction epoxies and trifunctional curing agents such as trifunctional epoxies; bis(2-methylaziridinyl) phenyl phosphine oxide and bis(2-methylaziridinyl) phenyl phosphine sulfide. Cures can be effected with these curing agents and the curable organo-metallic copolymers of the present invention using a —COOH to imine or —COOH to epoxy ratio of approximately 1:1 to 1:2.0.

We claim:
1. A liquid, curable, oragno-metallic copolymer selected from the group consisting of organo-metallic copolymers having the formulas

$$\left[HOOC\right]_y\left[\text{copolymer backbone}\right]\left[\overset{O}{\underset{\|}{C}}-O-M-R_{(n-1)}\right]_p$$

and $$\left[HOOC\right]_y\left[\text{copolymer backbone}\right]\underset{\diagdown}{\overset{\diagup}{\phantom{x}}}\begin{matrix}\left[\overset{O}{\underset{\|}{C}}-O-M'-R'_{(n'-1)}\right]_{p^1}\\ \left[\overset{O}{\underset{\|}{C}}-O-M^2-R^2_{(n^2-1)}\right]_{p^2}\end{matrix}$$

wherein M, M' and M² are metals selected from the group consisting of lead, tin, mercury, gallium, thallium, indium, platinum and germanium; n is the valence of the metal M, n' is the valence of the metal M' and n² is the valence of the metal M², and n, n' and n² are each whole numbers of 2 to 4; R, R' and R² are selected from the group consisting of alkyl, branched alkyl, aryl, alkaryl, aralkyl and alicyclic radicals; y is the amount of carboxyl groups on said backbone and is at least 0.02 gram equivalent per 100 grams of said organo-metallic copolymer and p is the amount of carboxylate groups on said backbone and corresponds to a value of approximately 0.02 up to 0.15−y gram equivalent per 100 grams of said organo-metallic copolymer in terms of carboxyl group content and $p^1$ plus $p^2$ equals p.

2. An organo-metallic copolymer as in claim 1 which has a viscosity of up to approximately 10,000 poises at room temperature.

3. An organo-metallic copolymer as in claim 1 in which said backbone is formed of monomeric components which impart liquid properties to said organo-metallic copolymer and monomeric components which supply carboxyl groups and sites for said carboxylate groups on said organo-metallic copolymer.

4. An organo-metallic copolymer as in claim 3 in which said monomeric components which impart liquid properties are selected from the group consisting of 1,3-butadiene; isoprene; chloroprene; fluoroprene; 2-cyano-1,3-butadiene; 2,3-dimethyl-1,3-butadiene; butyl acrylate; 2-ethylhexyl acrylate; octy acrylate; decyl acrylate and lauryl acrylate and said monomeric components which supply said carboxyl groups and said sites for said carboxylate groups are selected from the group consisting of acrylic acid, methacrylic acid, maleic acid, fumaric acid and itaconic acid.

5. An organo-metallic copolymer as in claim 1 in which said backbone is a polybutadiene-acrylic acid composition.

6. An organo-metallic copolymer as in claim 5 in which M, M¹ and M² are lead.

7. An organo-metallic copolymer as in claim 5 in which M, M¹ and M² are tin.

8. An organo-metallic copolymer as in claim 5 in which M, M¹ and M² are mercury.

9. An organo-metallic copolymer as in claim 5 and having the formula

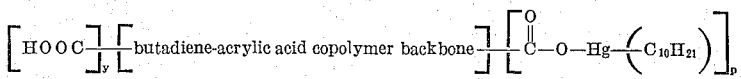

10. An organo-metallic copolymer as in claim 5 and having the formula

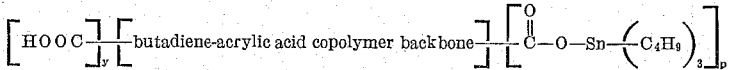

11. An organo-meallic copolymer as in claim 5 and having the formula

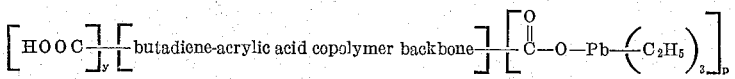

12. An elastomer produced by curing the composition of claim 1.

13. A film produced by coating a cure mixture containing the copolymer of claim 1 on a base structure and curing said mixture thereon.

14. A process for producing a liquid, curable, organo-metallic copolymer comprising reacting in less than stoichiometric proportions at least one liquid, carboxyl group containing copolymer with at least one basic organo-metallic compound selected from the group consisting of compounds having the formula $R_{(n-1)}MOH$ and $$R'_{(n'-1)}M'OM^2R^2_{(n^2-1)}$$

wherein M, M' and M² are metals selected from the group consisting of lead, tin, mercury, gallium, thallium, indium, platinum and germanium; and n, n' and n² are the valences respectfully, of the metals M, M' and M² and are each whole numbers of 2 to 4 and R, R' and R² are selected from the group consisting of alkyl, branched alkyl, aryl, alkaryl, aralkyl and alicyclic radicals.

15. A process as in claim 14 in which at least approximately 0.02 gram equivalent of carboxyl group per 100 grams of said liquid, curable oragno-metallic copolymers are left unreacted on said organo-metallic copolymer.

16. A process as in claim 15 further comprising curing said organo-metallic copolymer across said unreacted carboxyl groups.

References Cited by the Examiner

UNITED STATES PATENTS

| | | | |
|---|---|---|---|
| 2,724,707 | 11/55 | Brown | 260—80.7 |
| 2,849,426 | 8/58 | Miller | 260—83.5 |
| 3,012,018 | 12/61 | Marinelli et al. | 260—86.1 |
| 3,016,369 | 1/62 | Montermoso et al. | 260—80 |
| 3,069,394 | 12/62 | Mack | 260—78.5 |

OTHER REFERENCES

Rochow: J. Am. Chem. Soc., vol. 70, pages 1801–2 (1948).

JOSEPH L. SCHOFER, *Primary Examiner.*

HAROLD N. BURNSTEIN, DONALD E. CZAJA, LEON J. BERCOVITZ, *Examiners.*

UNITED STATES PATENT OFFICE
CERTIFICATE OF CORRECTION

Patent No. 3,201,376                      August 17, 1965

Stephen W. Osborn et al.

It is hereby certified that error appears in the above numbered patent requiring correction and that the said Letters Patent should read as corrected below.

Column 4, line 36, for "plus $p^2$ equals p and P/2" read -- plus $p^2$ equals p/2, p/2 --; columns 3 and 4, for that portion of the formula at the bottom of the page reading $$\left[\text{HOOC}\right]_{(m-)p} \quad \text{read} \quad \left[\text{HOOC}\right]_{(m-p)}$$

column 6, line 40, for "is" read -- was --; column 8, line 62, for "p+(1+yW)" read -- p(1+yW) --; line 71, for "noited" read -- noted --; column 9, line 53, for "amout" read -- amount --.

Signed and sealed this 15th day of March 1966.

(SEAL)
Attest:

ERNEST W. SWIDER                      EDWARD J. BRENNER
Attesting Officer                  Commissioner of Patents